June 18, 1963 M. W. BRADLEY 3,094,019
COMBINATION INSULATION STRIPPER AND WIRE SPLICER
Filed April 10, 1961
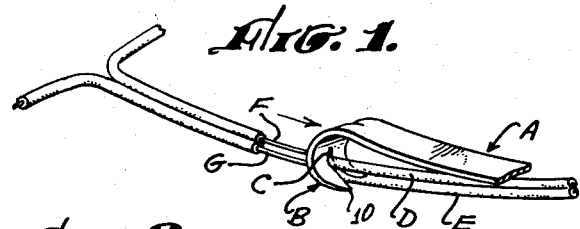
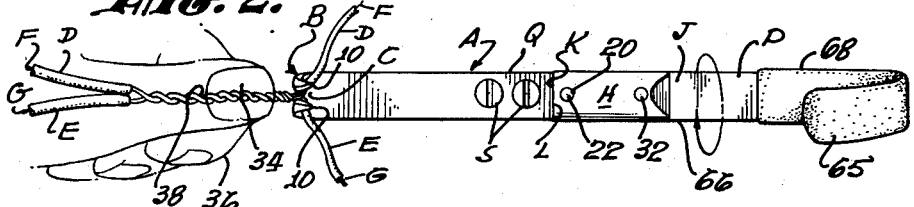
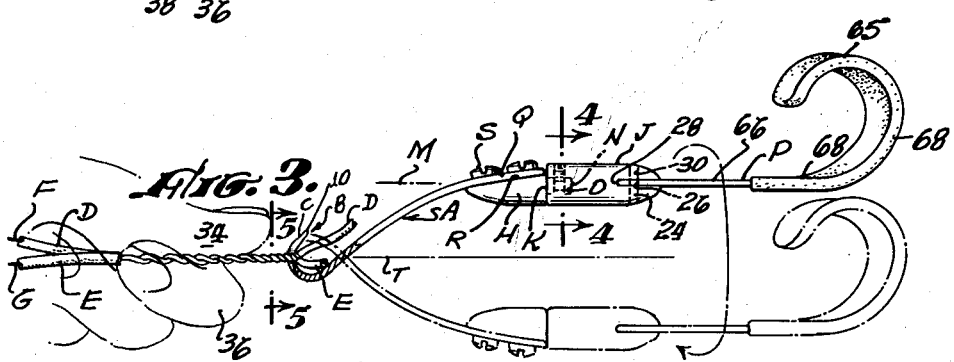
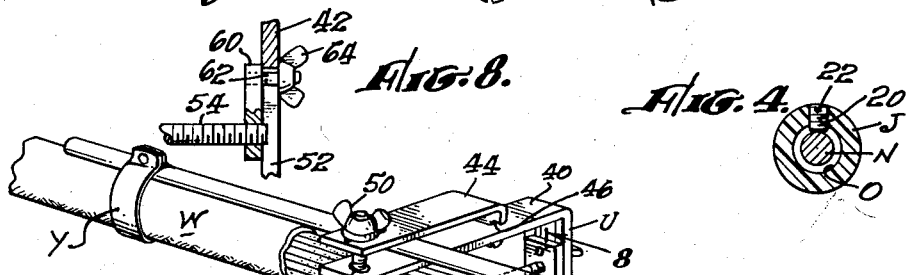
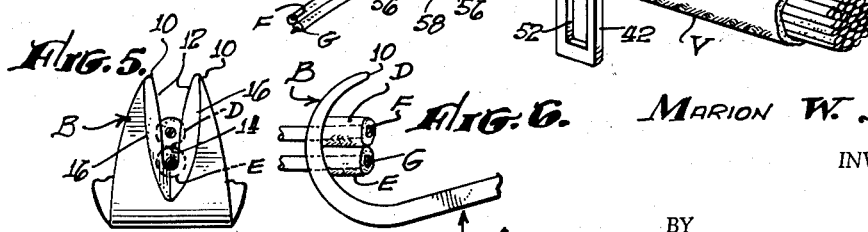
MARION W. BRADLEY,
INVENTOR.
BY
William C. Babcock
ATTORNEY.

United States Patent Office 3,094,019
Patented June 18, 1963

3,094,019
COMBINATION INSULATION STRIPPER AND
WIRE SPLICER
Marion W. Bradley, 14206 E. Coolbank Drive,
La Mirada, Calif.
Filed Apr. 10, 1961, Ser. No. 101,724
4 Claims. (Cl. 81—9.5)

The present invention relates generally to the field of wire stripping devices, and more particularly to a device by means of which desired lengths of insulation can be stripped concurrently from two adjacent electrical conductors, and thereafter splice the bared lengths of the conductors to effect an electrical conducting junction. The present application is a continuation-in-part of my co-pending patent application, entitled Wire Stripping Device, filed June 15, 1959, under Serial No. 820,279, which will issue as United States Letters Patent No. 2,978,934 on April 11, 1961.

Prior to the invention of the device disclosed and claimed in said application Serial No. 820,297, there was no insulation stripping device available that could be used safely without the danger of cutting or nicking the surface of an electrical conductor while removing the insulation therefrom. While the stripping device disclosed in application Serial No. 820,297 has been found to be entirely satisfactory when used commercially in stripping insulation from electrical conductors, one disadvantage thereof is that it is necessary to use means apart from the stripper to splice the bared conductors and form an electrical conducting junction.

The primary purpose in devising the present invention is to overcome this disadvantage of the device described and claimed in application Serial No. 820,297 by providing a combination insulation stripper and wire splicer by which these two operations can be performed consecutively without removing the electrical conductors from the invention.

A major object of the present invention is to provide a device that can be used to strip insulation from not only one, but two conductors when they are adjacently disposed and lie in substantially the same plane, and which can be accomplished without damage to either a single conductor or two conductors together during stripping thereof.

Another object of the invention is to provide an insulation stripping device that is particularly adapted for use in stripping insulation from, and effecting electrical connections between individual pairs of electrical conductors contained in a single cable such as encountered in telephone work.

Another object of the invention is to provide an improved insulation stripper and wire splicer that increases the efficiency with which insulation can be stripped from, and electrical connections made between electrical conductors such as used in telephone systems and the like, without danger of cutting or otherwise damaging the surfaces of the conductors.

A still further object of the invention is to provide a combination insulation stripper and wire splicer that is of extremely simple mechanical structure, can be fabricated from standard commercially available materials, is relatively inexpensive to manufacture, requires no maintenance attention, and can be sold at a sufficiently low price as to encourage its widespread use in stripping insulation from electrical conductors and effecting electrical conduction junctions therebetween.

These and other objects and advantages of the invention will become apparent from the following description of a preferred form thereof, as well as a guide used in conjunction therewith, and from the drawing illustrating the same in which:

FIGURE 1 is a perspective view of two portions of insulated electrical conductors disposed in substantially the same plane from which insulation is concurrently being stripped by use of the invention;

FIGURE 2 is a top plan view of the device showing the manner in which it is used to splice two insulation-free portions of electrical conductors to effect an electrical conducting junction;

FIGURE 3 is a side elevational view of the invention just before completion of a wire-splicing operation;

FIGURE 4 is a transverse cross-sectional view of the invention taken on line 4—4 of FIGURE 3;

FIGURE 5 is a front elevational view of the device taken on line 5—5 of FIGURE 3;

FIGURE 6 is a fragmentary side elevational view of the forward portion of the invention;

FIGURE 7 is a perspective view of a guide that may be removably affixed adjacent a cable from which pairs of wires are sequentially drawn and from which portions of insulation are stripped, with the bared portions of the wires thereafter being spliced to effect an electrical conducting junction therebetween; and FIGURE 8 is a fragmentary vertical cross-sectional view of a portion of the guide taken on line 8—8 of FIGURE 7.

With continuing reference to the drawing for the general arrangement of the invention, it will be seen to include an elongate rigid member A, the forward end portion of which has been bent to define an upwardly and rearwardly extending arcuate portion B in which a downwardly extending groove C is formed. The groove C, as may best be seen in FIGURES 5 and 6, is used to concurrently strip insulation D and E from two parallel adjacent electrical conductors F and G respectively.

First and second coaxially aligned elongate bodies H and J are provided that have adjacent faces K and L respectively which are normal relative to the longitudinal axis M of bodies H and J. A shaft N extends rearwardly from the first body H and is rotatably supported in a cavity O formed in the rear face L of second body J, as shown in FIGURE 3. A handle P extends rearwardly from the second body J (FIGURES 2 and 3). The rear portion Q of the elongate member A is rigidly affixed to a third face R of the first body H, by screws S or other conventional means.

Face R is angularly disposed relative to the longitudinal axis M. When the arcuate portion B of the elongate member A is caused to engage the conductors F and G to strip insulation therefrom as shown in FIGURES 2 and 3, the handle P is gripped in the hand. Thereafter the handle P is rotated about a longitudinal center line T whereby rotary motion can be imparted to the elongate member A to cause the arcuate portion B to twist the conductors F and G one upon the other to effect an electrical conducting junction therebetween. A guide U that may be conveniently used in aligning the conductors F and G when they are disposed within cable V from which a portion of the insulation W has been stripped is shown in FIGURE 7.

The guide U and the manner in which it is removably affixed to an elongate supporting member X that is usually provided to support the cable V therefrom will be described in detail hereinafter. The cable V is supported from the member X by bands Y that encircle the cable. Bands Y are affixed to the supporting member X by conventional means.

The arcuate portion B of the invention extends through more than 90° as may be seen in FIGURE 6. The cutting groove C is formed in the arcuate portion B and extends from an upper end 10 thereof downwardly substantially along the longitudinal axis of member A. The groove C is of such configuration as to define inwardly and downwardly tapering side walls 12 which terminate in a downwardly extending slot 14 of substantially constant width. The width of slot 14 is slightly greater than that of the conductors F and G from which the insulation D and E is to be stripped. Walls 12 of the cutting groove C are so tapered that the width of the groove at the upper end thereof is substantially greater than the diameter of one of the insulations D or E. The forward faces of side walls 12 are tapered inwardly to define elongate areas 16, which areas terminate in inwardly disposed cutting edges 18 that are utilized in stripping the insulations D and E from conductors F and G as the member A is moved longitudinally relative to the conductors.

As shown in FIGURE 5, the depth of slot 14 is at least twice the diameter of the insulation D or E on conductors F or G. Due to this construction of slot 14, two parallel adjacent conductors F and B may be concurrently stripped of insulations D and E as the arcuate portion B is moved in a direction to exert tension on the conductors F and G as shown in FIGURE 1.

The forward part of the second body J has a transverse tapped bore 20 formed therein in which a set screw 22 is threadedly disposed. Bore 20 is in communication with the cavity O. A circumferentially extending groove 24 is formed in shaft N that is engaged by the inner end of the set screw 22 whereby shaft N and the first body H are held in a fixed longitudinal position relative to second body J. A transverse bore 26 is formed in the forward portion of handle P. The rear end of second body J has a slot 28 formed therein in which the forward end of the handle P is disposed. When the forward end of handle P is so disposed, the bore 26 is in alignment with a transverse bore 30 formed in the second body J. A rivet or other fastening means 32 is extended through bores 26 and 30 to hold the handle P in a rigidly affixed position relative to the second body J as shown in FIGURE 3.

When it is desired to strip the insulations D and E from two aligned conductors F and G (FIGURE 7), the groove C in arcuate portion B is caused to engage the same, with the invention then moved in a direction to place tension on the conductors. As tension is placed on the conductors F and G in the manner just described, the insulations D and E is stripped therefrom. The lower edge portion of slot 14 is smooth and does not have a cutting edge formed thereon.

The user then grips the stripped portions 38 of conductors F and G between the thumb 34 and forefinger 36 of one hand, and with the other hand rotates the invention about the center line T (FIGURE 3) whereby the elongate member A rotates relative to body J and concurrently twists conductor portions 38 one over the other in the manner shown in FIGURES 2 and 3. When it is desired to sever the rearwardly disposed portions of the conductors F and G from the rear ends of portions 38 thereof as shown in FIGURE 2, the thumb 34 and finger 36 are tightened on the portions 38 to prevent further twisting thereof. After two or three rotations of the invention, with the thumb and finger so gripping the twisted portions, the conductors snap off. The portions of conductors F and G that snap off are located rearwardly of the groove C, as shown in FIGURE 2.

When a pair of conductors F and G are disposed within a cable V from which a section of insulation W has been cut to permit splicing of this pair of conductors, the projecting portions of conductors F and G are conveniently held in a fixed position by the guide U shown in FIGURE 7. In detail the guide U includes an L-shaped member having a first leg 40 and a second leg 42 that is disposed normal relative thereto. A third leg 44 is hingedly connected at 46 to the first leg 40 as shown. A threaded member 48 extends upwardly from the outer end of the first leg 40 and projects through an opening (not shown) in the third leg. The upwardly projecting portion of the threaded member 48 is threadedly engaged by a thumb nut 50. When the elongate member X is positioned between the upper surface of the first leg 40 and the lower surface of the third leg 44, and the nut 50 appropriately rotated, the legs 40 and 44 are pivoted together to grip opposing sides of the member X and support the guide U therefrom.

A longitudinally extending opening 52 is formed in second leg 42. An arm 54 projects outwardly from the second leg 42, and two laterally spaced legs 56 depend from the outer end of this arm. Legs 56 define a groove 58 therebetween that is slightly wider than the diameter of the insulation on conductors F or G and in depth is at least twice the diameter of conductors F or G.

A block 60 of greater width than that of opening 52 is affixed to the end of arm 54 opposite that from which legs 56 depend. Block 60 has a threaded member 62 that projects through the opening 52, as may best be seen in FIGURE 8. A wing nut 64 threadedly engages the projecting portion of member 62. When nut 64 is rotated in an appropriate direction, the nut and block 60 frictionally grip a portion of the second leg 42 therebetween to hold the same in fixed position relative thereto. In this manner arm 54 can be adjusted to any desired height relative to the insulated conductors F and G disposed within the confines of the cable V, as well as other pairs of conductors in the cable.

The guide U serves to hold the insulated conductors F and G in an outwardly extending, vertically aligned position (FIGURE 7) where they are easily engaged by the groove C on the arcuate portion B of the invention in the manner shown in FIGURE 1 whereby the insulation D and E can be stripped therefrom. After the desired lengths of insulation D and E have been stripped from the conductors F and G, the invention is utilized in the manner shown in FIGURES 2 and 3 to twist the conductors F and G one upon the other to effect an electrical conducting junction therebetween.

The rear end of handle P is preferably bent or otherwise formed to extend through more than 270°, with the curved portion 65 thereof being laterally offset from the forward handle portion 66. If desired, the curved portion 65 of handle P can be dipped in a polymerizable resin to apply a protective coating 68 thereon, as shown in FIGURE 2.

Although the present invention is fully capable of achieving the objects and providing the advantages hereinbefore mentioned it is to be understood that it is merely illustrative of the presently preferred embodiment thereof and I do not mean to be limited to the details of construction herein shown and described, other than as defined in the appended claims.

I claim:

1. A device for use in first stripping insulation from two parallel adjacent electrical conductors and then twisting the stripped portions of said conductors one upon the other to effect an electrical conducting junction therebetween, comprising: an elongate rigid member having a straight rearward portion, an intermediate portion that extends downwardly and forwardly from said rearward portion, a forward upwardly extending arcuate portion, the upper part of which arcuate portion projects rearwardly, and a cutting groove formed in said arcuate portion that extends downwardly from the upper extremity thereof substantially along the longitudinal axis of said member to divide said arcuate portion into two laterally spaced downwardly convergent side walls, said side walls being beveled to form opposing cutting edges, with the upper ends of said side walls being laterally spaced a distance greater than the diameter of the insulation on one of said conductors, and a slot of substantially constant width in said arcuate portion extending downwardly from and coextensive with said convergent side walls, the width of which slot is slightly greater than the diameter of one of said conductors with the depth of said slot being at least twice the diameter of said insulation on one of said conductors; a handle; and means for rotatably supporting said rearward portion of said rigid member forwardly of said handle to permit said elongate member, handle and means to be moved longitudinally relative to said conductors when said conductors are engaged by said slot to concurrently strip desired lengths of said insulation therefrom and thereafter effect said electrical conducting junction by rotating said handle eccentrically relative to said lengths of said stripped conductors to twist said stripped lengths one upon another.

2. A device as defined in claim 1 wherein said means for rotatably supporting said rearward portion of said rigid member are first and second elongate, coaxially aligned rigid bodies having first and second faces respectively that are diposed normal relative to the longitudinal axes of said first and second bodies, with said second body having a recess formed therein which extends rearwardly thereinto from said second face; means for supporting said rearward portion of said rigid member from said first body in an angularly disposed position relative to the longitudinal axis of said first body; a shaft that extends rearwardly from said first face and is rotatably supported in said recess; means for removably maintaining said shaft in said cavity; and means for supporting said second body from the forward end portion of said handle.

3. A device as defined in claim 2 wherein said handle is an elongate rigid member having a rearward portion that curves downwardly and forwardly at a radius of curvature through an arc of more than 270° with respect to said forward end portion of said handle to form a finger-gripping portion, which finger-gripping portion is twisted laterally through an angle in a plane normal relative to that of said forward end portion such that when supported around a finger of and gripped in the hand of the user, said finger-gripping portion will lie in alignment with and concentrically of the finger.

4. A device as defined in claim 2 wherein said means for removably maintaining said shaft in said cavity is a tapped transverse bore formed in said second body, a circumferentially extending groove in said shaft, and a screw that threadedly engages said tapped bore to extend into said cavity to engage said circumferential groove.

References Cited in the file of this patent
UNITED STATES PATENTS

| | | |
|---|---|---|
| 955,370 | Sullivan | Apr. 19, 1910 |
| 1,388,398 | Adams | Aug. 23, 1921 |
| 2,081,549 | McHale | May 25, 1937 |
| 2,273,048 | Kiefer | Feb. 17, 1942 |
| 2,475,525 | Shields | July 5, 1949 |
| 2,682,063 | Miloche | June 29, 1954 |
| 2,743,070 | Pieper | Apr. 24, 1956 |
| 2,836,837 | Belek | June 3, 1958 |
| 2,929,286 | Blakely | Mar. 22, 1960 |
| 2,978,934 | Bradley | Apr. 11, 1961 |